June 6, 1950     E. H. DANIELS     2,510,307
MEANS FOR SECURING A FABRIC COVER OVER AN ENCLOSURE
Filed July 21, 1947
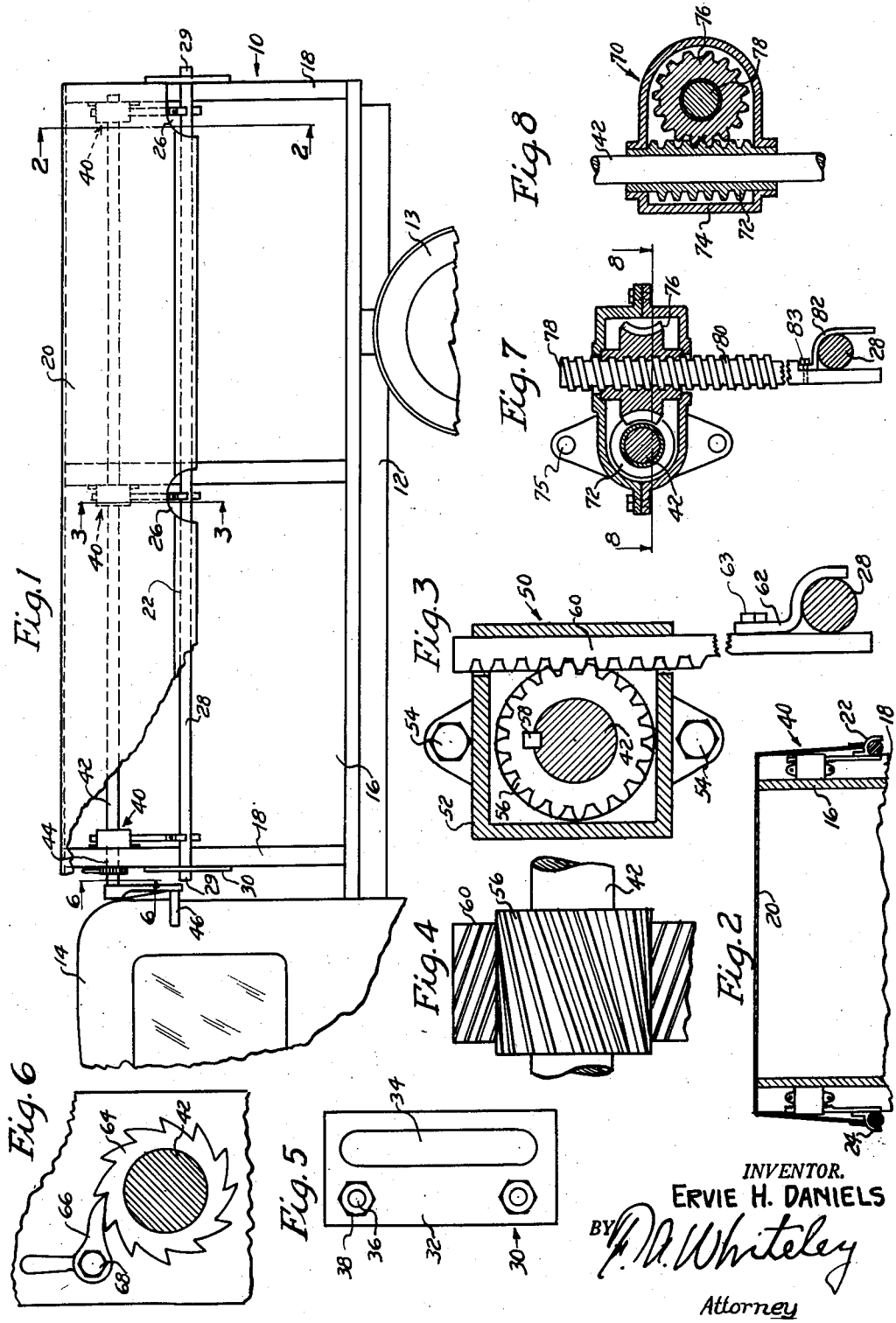
INVENTOR.
ERVIE H. DANIELS
BY
Attorney Patented June 6, 1950

2,510,307

UNITED STATES PATENT OFFICE 2,510,307

MEANS FOR SECURING A FABRIC COVER OVER AN ENCLOSURE

Ervie H. Daniels, Aitkin, Minn.

Application July 21, 1947, Serial No. 762,287

5 Claims. (Cl. 296—100)

My invention relates to improvements in means for securing a fabric cover over an enclosure. In particular, it relates to a means for securing a fabric cover, such as a tarpaulin, over the open top, or the top and sides of an enclosure such as a wagon or truck body used for transporting materials such as farm products.

In the transportation of various forms of materials, including farm crops, it is a common practice to use a wagon or truck body which is generally rectangular in shape and is open at the top. To protect the cargo from the weather and also to prevent loss by spillage, it is customary to use a heavy fabric cover such as a tarpaulin, which fits over the top, or top and sides of the body and must be securely fastened by some suitable means to the sides or base of the truck body. In the prior art practice, it has been customary to secure the cover with a plurality of ropes, which extend through apertures or eyelets in the cover and are suitably tied to portions of the body. This prior art method of securing a cover presents two major handicaps. Primarily, it is extremely difficult for an individual, working by himself, to properly arrange the cover over the top of the enclosure. This is particularly true when there is any considerable amount of air movement, since the wind tends to make the cover unmanageable. Secondly, it is very difficult for an individual working by himself to stretch the cover properly so that it is uniformly taut over the entire body. If the cover is not sufficiently taut, the normal movement of the vehicle will tend to cause the cover to act as an air scoop when the vehicle is in motion, thus creating stresses in the cover to the extent that there is likelihood of its being torn, or causing a rending of the ropes.

The present invention is directed to a relatively simple and inexpensive means for attaching the cover to the enclosure, such as a truck body, and includes a mechanism which is operable by an individual working alone, to easily and uniformly tighten the cover throughout its full extent so that it will suitably protect the cargo and at the same time place the cover under sufficient tension to prevent it from acting as an air scoop when the vehicle is in motion. Briefly, the cover is constructed in a manner as to receive a relatively rigid member on one or both of its lateral edges. These rigid members are suitably supported on the sides of the enclosure so that at least one of the members is arranged to be vertically movable with respect to the truck body. A plurality of extensible members are suitably mounted on one or both sides of the enclosure and are arranged to contact one or both of the rigid members at spaced apart distances over the linear dimensions of the member. These extensible members are in turn connected to a driving mechanism which is operable to move the extensible members simultaneously in such a manner as to exert a uniform force upon the rigid member and the cover throughout its lateral extent. By suitable means, either the driving member or the extensible member, or both, may be locked when sufficient tension has been placed on the cover so as to maintain the cover taut. It is, of course, necessary that one lateral side of the cover be anchored in position while force is being applied to the other side. This may be accomplished by providing a relatively stationary attachment for holding one lateral extremity of the cover, or the arrangement discussed heretofore may be placed on both sides of the enclosure to enable the operator to equally distribute the forces applied to the cover from either side of the enclosure.

An object of my invention is to provide a mechanically operable means for securing a fabric cover on an enclosure.

Another object is to provide a mechanism for stretching a fabric cover over an open side of an enclosure wherein the mechanism is capable of being operated by a single individual.

Another object is to provide in combination with a tarpaulin used in covering an open top truck body, a substantially rigid member secured to one lateral edge of the tarpaulin and a plurality of mechanically operable extensible members mounted on the truck body and engageable with the rigid member for exerting a uniform force at several places on the rigid member to stretch the tarpaulin.

Another object is to provide a mechanism for stretching a tarpaulin over the open top of a truck body, which includes a plurality of extensible members for exerting a uniform force on the tarpaulin, together with means for locking the mechanism when the tarpaulin is taut.

A further object is to provide in combination with a tarpaulin which is adapted to be stretched over the open top of a truck body, a mechanism for stretching the tarpaulin, which includes a rigid member secured to one lateral edge of the tarpaulin and a plurality of either spiral or worm gear driven extensible members connected to a unitary driving member and arranged in a manner as to lock the tarpaulin under tension when it is sufficiently taut.

Other and further objects will become apparent from the following description and claims, and in the appended drawings in which:

Fig. 1, is a side elevation of a truck body having a tarpaulin arranged over its open top and, in general, shows the mode of application of the present invention;

Fig. 2, is a section taken on the line 2—2 of Fig. 1;

Fig. 3, is a section taken on the lines 3—3 of

Fig. 1, showing one form of an extensible mechanism;

Fig. 4, is a side view of the mechanism shown in Fig. 3, with the casing removed;

Fig. 5, is a detailed view of one of the brackets shown in Fig. 1;

Fig. 6, is a detailed view taken on the lines 6—6 of Fig. 1; and,

Figs. 7 and 8 show a modification of structures shown in Figs. 3 and 4.

Referring now to the several views of the drawings, the invention will be explained in detail. General reference numeral 10 indicates an enclosure such as an open topped cargo body mounted on a truck chassis 12 and shown in relation to the rear wheels 13 and the driver's cab 14. The truck body 10 consists of the usual vertical side walls 16 and a plurality of spaced apart stakes 18. Although the truck body shown is provided with vertical side walls, it will be understood that the invention is applicable to numerous forms of truck bodies including those having semi-circular hoops extending over the top or to a body which merely has stakes on the sides.

A fabric cover such as a heavy canvas tarpaulin 20 is adapted to be positioned over the open top of the enclosure or truck body 10 and serves both to protect the cargo from the weather and also to prevent spillage of the cargo during transit. At each of its lateral sides, and as shown in Fig. 2, cover 20 is provided with hems in the form of loops 22 and 24. The cover is also provided with spaced apart cut-away portions 26, which extend through the hems or loops and whose purpose will be described hereinafter.

Extending longitudinally through each of the loops 22 and 24 is a relatively rigid member 28, which may be constituted of a rod or tube, and is somewhat longer than the length of cover 20 so as to form the protruding ends 29. The ends 29 of rigid member 28 extend through elongated slots in a pair of bracket members 30, which are secured on either end of the lateral sides of enclosure 10. One of brackets 30 is shown in detail in Fig. 5 and consists of a metal body member 32 having an elongated slot 34 which receives the end 29 of rigid member 28. The plate 32 is secured to the end stakes 18 by bolts 36 and nuts 38.

Secured on the sides of the several stakes 18 are a plurality of extensible members indicated by the general reference numeral 40. These extensible members 40 may assume one or more general forms but they are all controlled by a driving member in the form of a shaft 42 which extends for the full length of body 10 and is supported by suitable bearings 44 in each of the several stakes 18. At one end, the driving member 42 is connected to a manually operable crank 46 which is so positioned with relation to enclosure 10 and cab 14 as to permit easy and simultaneous operation of all of the extensible members 40 by a single individual.

Referring now to Figs. 3 and 4, is shown one modification of the extensible members indicated by the general reference numeral 40 in Fig. 1, and is here shown as a rack and gear mechanism indicated by the general reference numeral 50. Within a housing 52 which is supported on any one of stakes 18 by a plurality of bolts 54 is a spiral pinion gear 56 keyed to the driving member 42 at 58 and connected to a spiral geared rack bar 60. At its lower end, rack bar 60 carries a bracket 62 which is secured to rack bar 60 by a bolt 63. When operative, the bracket 62 extends through the cut-away portion 26 of cover 20 and engages the rigid member 28. When the extensible members 40 take the form of the rack and pinion mechanism 50, the spiral gears will have a tendency to provide a certain amount of locking action between pinion gear 56 and rack 60, but this may not be sufficient to hold the cover 20 under tension and under those circumstances a ratchet gear 64, shown in Fig. 6, is mounted on the driving shaft 42 and cooperates with a pawl 66 that is pivotally mounted at 68 on one end of the truck body 10.

Referring now to Figs. 7 and 8, is shown another and preferred modification of the extensible members indicated in Figs. 1 and 2, by the general reference numeral 40, but here indicated specifically by the general reference numeral 70. As shown in Figs. 7 and 8, the driving shaft 42 carries a worm gear 72 which is connected within a casing 74 with a pinion gear 76 having on its outer surface, curved teeth, which are cooperable with the gear teeth of worm gear 72. Casing 74 is adapted to be secured on a stake 18 by bolts 75. A vertically movable shaft 78 having an exterior helical or worm gear 80 is supported for vertical movement within gear 76, and at its lower extremity, shaft 78 carries a bracket 82 which is secured to shaft 78 by a bolt 83 and is similar in many respects to bracket 62 and which is cooperable with the rigid shaft 28 in a manner generally similar to bracket 62.

As shown in Fig. 2, the truck body 10 is provided with extensible members 40 on either side so as to provide a means of applying tension to either lateral extremity of the cover 20, but it will be understood that where desired, the extensible mechanism may be applied to only one side of the enclosure and the opposite side could be secured or anchored in a suitable manner, as for example, by suitable stationary brackets for holding one of the rigid members 28 in an immovable manner.

The operation of the invention will now be explained in detail. When it is desired to place cover 20 over the open top of enclosure 10, a rigid member 28 is slidably mounted through a loop 22 and another such member 28 is slidably mounted through loop 24. The opposite protruding ends 29 of rigid member 28 are inserted in slots 34 of bracket members 30. When desired, bracket members 30 may be loosened on bolts 36 to permit the easy entrance of the ends 29 within the slots 34. The hook shaped members 62 or 82 of the extensible members 50 or 70 are passed through the openings 26 and arranged to hold the rigid member within their looped or hook shaped interior. Assuming that this operation has taken place on one side of the truck body 10, the opposite lateral edge of the tarpaulin is fitted with a rigid member 28 and the same is passed over the open truck body, and since member 28 will have a certain amount of mass, this may be accomplished by merely tossing it over the truck body. With the tarpaulin in a relatively loose condition, the rigid member 28, which is now to receive tension, is mounted within brackets 30 in the manner previously indicated and the several extensible members 50 or 70 through their hook connections 62 or 82 are secured about the periphery of rigid member 28. Then by rotating crank handle 46, the driving member 42 simultaneously causes each of the several extensible members to exert at spaced apart distances an equal tension upon the rigid member 28. If a rack and gear mechanism such as is indicated by general reference numeral 50 is utilized, it may be necessary to augment this mechanism with a ratchet gear such as indicated by reference numeral 64 and a pawl 66 in order to lock the several extensible members under tension after the cover 20 has been suitably stretched. If, however, a mechanism such as indicated by general reference numeral 70 is utilized, the worm gears shown therein are of a self-locking nature and will maintain tension on the extensible members and the cover 20, without reliance on any other means to provide for locking the extensible members under tension since an upwardly directed force on shaft 78 will not cause gear 76 to rotate.

Although the invention has been shown and described in conjunction with a truck body which is substantially rectangular in form, and having relatively high side walls, it will be understood that this in no way constitutes a limitation as the invention is applicable to any form of truck body.

The advantages of the present invention are that primarily a mechanism is provided which is operable by a single individual and with which he may place the tarpaulin under considerable tension and lock it in that condition without additional assistance. Secondly, the invention permits the tarpaulin or cover to be placed under tension which is equally distributed over the linear dimension of the cover and will thus prevent the cover from being torn by excessive or unequally applied tension.

As numerous modifications may be evident to those skilled in the art, my invention is defined in the terms of the appended claims.

I claim:

1. In combination with a truck body, a fabric cover adapted to extend over said body in such a manner as to protect a cargo carried by said body, means for securing said cover on said body including, means for anchoring one lateral side of said cover to said body, a relatively rigid member joined to the opposite lateral extremity of said cover and extending parallel thereto, a driven shaft carried by said body and engageable with said rigid member said shaft having gearing on its outer surface, and manually operable means having a geared connection with said driven shaft for moving said shaft and said rigid member in such a manner as to exert lateral tension on said cover.

2. In combination with a truck body, a fabric cover adapted to extend over said body from one lateral side to another, means for anchoring said cover on one side of said body, a loop formed on the opposite side of said cover, a relatively rigid rod positioned in said loop and extending beyond the linear dimensions of said cover, slotted brackets carried on each end of said body for receiving the opposite ends of said rod, a plurality of rigid extensible shafts carried by said body and engaging said rod at spaced apart distances throughout its length, and a manually operable driving member carried by said body having positive acting connections with each of said extensible shafts for simultaneously moving said several shafts in such a manner as to exert a uniform distributed force upon said cover throughout the linear dimension of said rod.

3. In combination with a truck body, a fabric cover adapted to extend over said body from one lateral side to another, means for anchoring one side of said cover to said body, a relatively rigid rod joined to the opposite lateral side of said cover and extending parallel to the edge of said cover, a plurality of extensible shafts carried on the side of said body and adapted to engage said rigid member at spaced apart distances throughout its length, a rotatable driving shaft mounted on said body member adjacent said extensible shafts, and gear connections between said driving shaft and said extensible shafts for transmitting movement between the driving shaft and the extensible shafts.

4. In combination with a truck body, a fabric cover adapted to extend over said body from one side to another, means for anchoring one side of said cover to said body, a plurality of independent driven shafts carried on one side of said body member in spaced relation to each other, connecting means for operatively connecting one end of each of said shafts at spaced apart distances from each other to a lateral extremity of the cover, a rotatable driving shaft carried on the side of said body member adjacent said several shafts, and gear connections between each of said driven shafts and said driving shaft for transmitting movement from the driving shaft to the several driven shafts.

5. In combination with a truck body, a fabric cover adapted to extend over said body to protect a cargo carried in said body, means for anchoring a first lateral extremity of said cover to a portion of said body, and means for exerting a tension on a second lateral extremity of said cover in such a manner as to render the cover taut over the body, comprising a plurality of spaced apart shafts carried by said body member, each of said shafts being operatively connected at spaced apart distances from each other to the second lateral extremity of said cover, each of said shafts having a helical worm gear on its outer surface, a pinion gear surrounding each of said shafts and having an internal worm gear surface cooperatively connected with worm gear on the outer surface of said shaft, and a rotatable driving shaft carried by the body member having spaced apart worm gear surfaces in contact with each of said pinion gears, said driving shaft being operable to simultaneously move said several shafts to provide uniform tension on the second lateral side of said cover.

ERVIE H. DANIELS.

REFERENCES CITED

The following references are of record in the file of this patent:

UNITED STATES PATENTS

| Number | Name | Date |
| --- | --- | --- |
| 473,292 | Campbell | Apr. 19, 1892 |
| 604,807 | Tenney | May 31, 1898 |
| 879,218 | Tickerhoof | Feb. 18, 1908 |
| 1,318,820 | Watkins | Oct. 14, 1919 |
| 1,375,027 | Thompson | Apr. 19, 1921 |
| 1,380,083 | Snapp | May 31, 1921 |
| 1,784,248 | Nolen et al. | Dec. 9, 1930 |
| 1,786,048 | Williams | Dec. 23, 1930 |
| 2,346,554 | Clark | Apr. 11, 1944 |

FOREIGN PATENTS

| Number | Country | Date |
| --- | --- | --- |
| 120,322 | Great Britain | Nov. 7, 1918 |